United States Patent
Kolay et al.

(10) Patent No.: US 11,887,012 B1
(45) Date of Patent: Jan. 30, 2024

(54) ANOMALY DETECTION USING RPCA AND ICA

(71) Applicant: SAS Institute Inc., Cary, NC (US)

(72) Inventors: Sudipta Kolay, East Providence, RI (US); Steven Guanxing Xu, Seattle, WA (US); Kai Shen, Apex, NC (US); Zohreh Asgharzadeh Talebi, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/223,717

(22) Filed: Jul. 19, 2023

Related U.S. Application Data

(60) Provisional application No. 63/463,543, filed on May 2, 2023, provisional application No. 63/457,053, filed on Apr. 4, 2023.

(51) Int. Cl.
  *G06N 5/022* (2023.01)
  *G06N 20/00* (2019.01)
  *G06F 17/16* (2006.01)

(52) U.S. Cl.
  CPC .............. *G06N 5/022* (2013.01); *G06F 17/16* (2013.01); *G06N 20/00* (2019.01)

(58) Field of Classification Search
  None
  See application file for complete search history.

(56) References Cited

FOREIGN PATENT DOCUMENTS

CN 112098915 A * 12/2020 ............. G01R 35/02

OTHER PUBLICATIONS

Chen, Shuhan, Chein-I. Chang, and Xiaorun Li. "Component decomposition analysis for hyperspectral anomaly detection." IEEE Transactions on Geoscience and Remote Sensing 60 (2021): 1-22. (Year: 2021).*

Chang, Chein-I. "Effective anomaly space for hyperspectral anomaly detection." IEEE Transactions on Geoscience and Remote Sensing 60 (2022): 1-24. (Year: 2022).*

A.J. Bell and T.J. Sejnowski. An information maximization approach to blind separation and blind deconvolution. Neural Computation, 7:1129-1159, 1995.

Candès, Emmanuel J., et al. "Robust principal component analysis ?." Journal of the ACM (JACM) 58.3 1-37 (2011).

(Continued)

*Primary Examiner* — Eric Nilsson
(74) *Attorney, Agent, or Firm* — Bell & Manning, LLC

(57) ABSTRACT

A computing device identifies an anomaly among a plurality of observation vectors. An observation vector is projected using a predefined orthogonal complement matrix. The predefined orthogonal complement matrix is determined from a decomposition of a low-rank matrix. The low-rank matrix is computed using a robust principal component analysis algorithm. The projected observation vector is multiplied by a predefined demixing matrix to define a demixed observation vector. The predefined demixing matrix is computed using an independent component analysis algorithm and the predefined orthogonal complement matrix. A detection statistic value is computed from the defined, demixed observation vector. When the computed detection statistic value is greater than or equal to a predefined anomaly threshold value, an indicator is output that the observation vector is an anomaly.

30 Claims, 12 Drawing Sheets
(2 of 12 Drawing Sheet(s) Filed in Color)

(56) References Cited

OTHER PUBLICATIONS

SAS/IML® User's Guide 15.1, Cary, NC: SAS Institute Inc. pp. 1-24, 187-191, 313-386, 822-854, 2018.
SAS® Visual Data Mining and Machine Learning 8.1 Data Mining and Machine Learning Procedures, Cary, NC: SAS Institute Inc. pp. 19-32 and 187-204, 2017.
SAS® Visual Statistics 8.4 Programming Guide, Cary, NC: SAS Institute Inc. pp. 167-186, Dec. 15, 2022.
SAS® Visual Statistics Procedures 2022.12*, Cary, NC: SAS Institute Inc. pp. 569-592, Dec. 15, 2022.
SAS® Visual Data Mining and Machine Learning 8.4 Programming Guide, Cary, NC: SAS Institute Inc. pp. 19-32 and 1199-1252, 2019.
Chalapathy, Raghavendra, Aditya Krishna Menon, and Sanjay Chawla. "Robust, deep and inductive anomaly detection." Machine Learning and Knowledge Discovery in Databases: European Conference, ECML PKDD 2017, Skopje, Macedonia, Sep. 18-22, 2017, Proceedings, Part I 10. Springer International Publishing, 2017; pp. 1-16.
A. Hyvarinen. Fast and robust fixed-point algorithms for independent component analysis. IEEE Trans. on Neural Networks, 10(3):626-634, 1999.
A. Hyvarinen and E. Oja. A fast fixed-point algorithm for independent component analysis. Neural Computation, 9(7):1483-1492, 1997.
Johnson, Robert J., Jason P. Williams, and Kenneth W. Bauer. "AutoGAD: An improved ICA-based hyperspectral anomaly detection algorithm." IEEE Transactions on Geoscience and Remote Sensing 51.6 (2012): 3492-3503.
T.W. Lee, M. Girolami, and T. J. Sejnowski. Independent component analysis using an extended infomax algorithm for mixed subgaussian and supergaussian sources. NeuralComputation, 11(2):417-441, 1999.
Lughofer, Edwin, et al. "On-line anomaly detection with advanced independent component analysis of multi-variate residual signals from causal relation networks." Information sciences 537 (2020): 425-451.
Yasunori Nishimori and Shotaro Akaho, Learning algorithms utilizing quasi-geodesic flows on the Stiefel manifold, Neurocomputing 67 pp. 106-135 (2005).
Downs, James J., and Ernest F. Vogel. "A plant-wide industrial process control problem." Computers & chemical engineering 17.3 (1993): 245-255.
Roger P. Woods, ica_pca: Performs mixed ICA/PCA on the input matrix, built May 2, 2019, pp. 1-6 . . . .
Shawhin Talebi, Independent Component Analysis (ICA), Towards Data Science, Mar. 17, 2021; pp. 1-21.

* cited by examiner

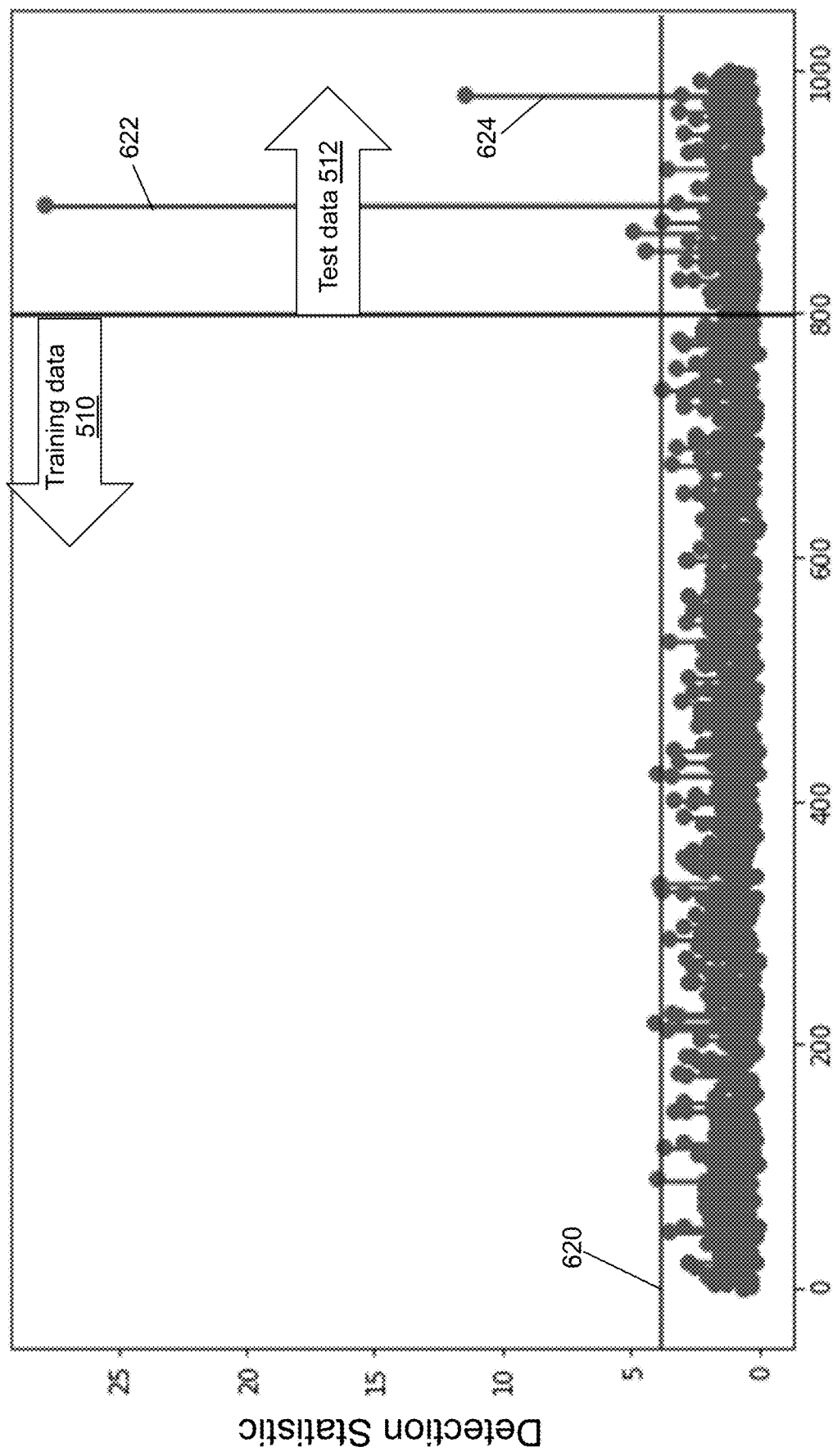

US 11,887,012 B1

ANOMALY DETECTION USING RPCA AND ICA

CROSS-REFERENCE TO RELATED APPLICATIONS

The present application claims the benefit of and priority under 35 U.S.C. § 119(e) to U.S. Provisional Patent Application No. 63/457,053 filed on Apr. 4, 2023, the entire contents of which is hereby incorporated by reference. The present application also claims the benefit of and priority under 35 U.S.C. § 119(e) to U.S. Provisional Patent Application No. 63/463,543 filed on May 2, 2023, the entire contents of which is hereby incorporated by reference.

BACKGROUND

Machine learning defines models that can be used to predict occurrence of an event, for example, from sensor data or signal data, or recognize/classify an object, for example, in an image, in text, in a web page, in voice data, in sensor data, etc. The event may indicate identification of an anomaly that is a rare or an unusual or an outlier observation relative to other observations from a sensor or a system component. Thus, the anomaly deviates significantly from most observations obtained from the sensor or the system component. Various anomaly detection algorithms exist with application in areas including medical signal processing, audio signal processing, image separation, astronomy and cosmology, etc. Improved accuracy and reduced false alarms with reduced dependence on algorithm tuning parameters are needed.

SUMMARY

In an example embodiment, a non-transitory computer-readable medium is provided having stored thereon computer-readable instructions that, when executed by a computing device, cause the computing device to identify an anomaly among a plurality of observation vectors. An observation vector is projected using a predefined orthogonal complement matrix. The predefined orthogonal complement matrix is determined from a decomposition of a low-rank matrix. The low-rank matrix is computed using a robust principal component analysis algorithm. The projected observation vector is multiplied by a predefined demixing matrix to define a demixed observation vector. The predefined demixing matrix is computed using an independent component analysis algorithm and the predefined orthogonal complement matrix. A detection statistic value is computed from the defined, demixed observation vector. When the computed detection statistic value is greater than or equal to a predefined anomaly threshold value, an indicator is output that the observation vector is an anomaly.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to identify an anomaly among a plurality of observation vectors.

In an example embodiment, a method of identifying an anomaly among a plurality of observation vectors is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 6C depicts the detection statistic computed for the sample signal data of FIG. 5 using the trained detection model to identify an anomaly with a Fast-ICA algorithm in accordance with an illustrative embodiment.

DETAILED DESCRIPTION

Figure 1:
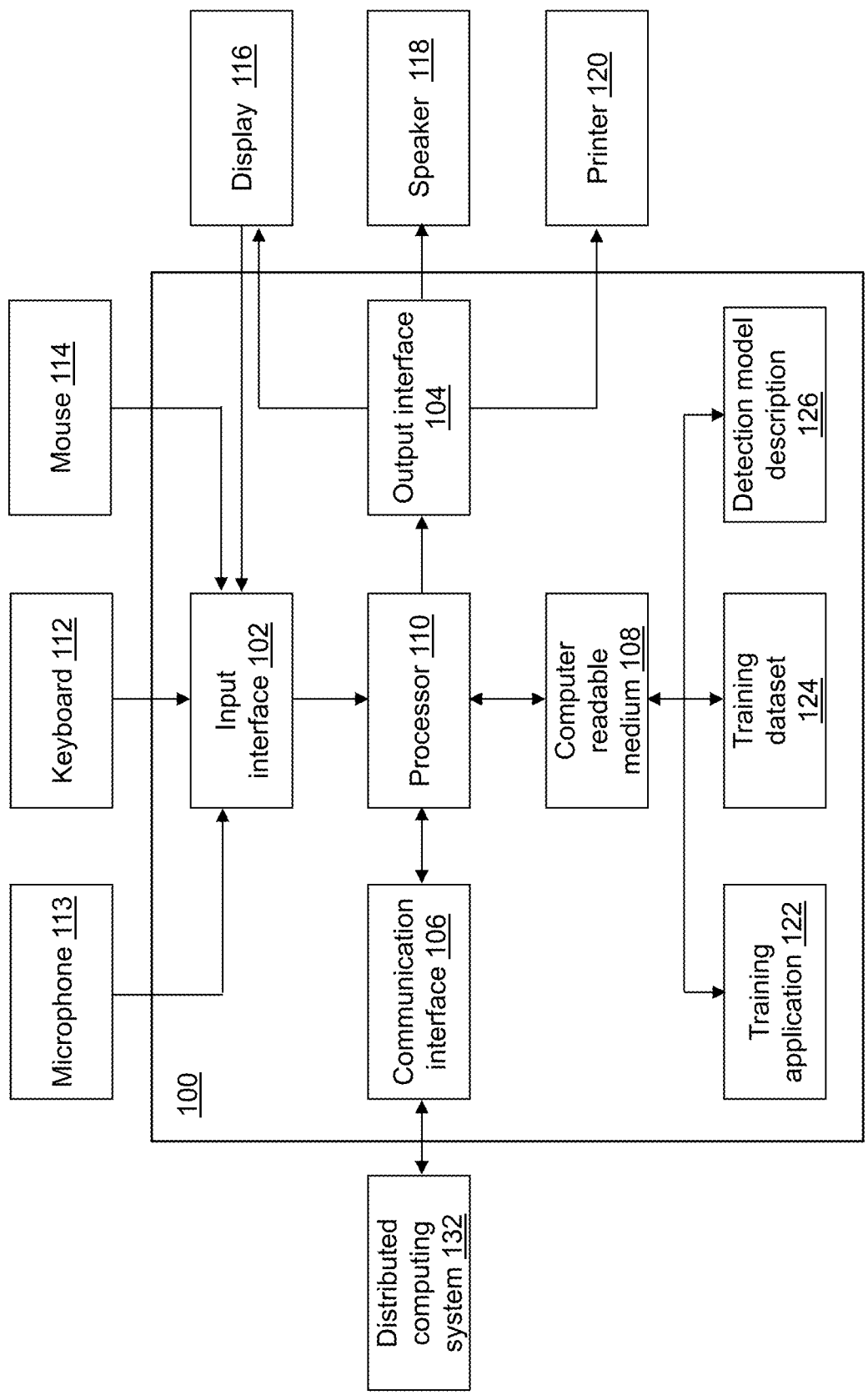
FIG. 1 depicts a block diagram of an anomaly detection device in accordance with an illustrative embodiment.

Robust principal component analysis (RPCA) is a robust version of principal component analysis (PCA). A matrix M is decomposed into a low-rank matrix L and a sparse matrix S, such that M approximately equals L+S using a tuning parameter $\lambda$ to minimize $\text{rank}(L)+\lambda\|S\|_0$ subject to the constraint L+S=M. Because this objective function is non-convex, it can be replaced with a convex relaxation by replacing the rank with a nuclear norm that is a sum of the singular values and replacing the 0-norm with a 1-norm minimize $\|L\|^*+\lambda\|S\|_1$ lit subject to the constraint L+S=M. Replacing this convex optimization problem using an augmented Lagrange multiplier method or an accelerated proximal gradient method results in a faster processing time. Using RPCA, non-anomalous observations lie close to the low-rank space generated from the low-rank matrix L, and the sparse matrix S can be used to identify or detect anomalies. The low-rank matrix L has a lower rank than the matrix M. The sparse matrix S is expected to have most entries close to zero.

Independent component analysis (ICA) finds true latent sources from observed signals and has application in signal separation, artifact detection, image processing, etc. Two popular methods for performing ICA are a Fast-ICA algorithm and an extended Infomax algorithm. The Fast-ICA algorithm is described, for example, in a paper by Aapo Hyvärinen and Erkki Oja titled *A fast fixed-point algorithm for independent component analysis* and published in Neural Computation in volume 9 at pages 1483-1492 in 1997 and in a paper by Aapo Hyvärinen titled *Fast and robust fixed-point algorithms for independent component analysis* and published in IEEE transactions on neural networks in volume 10 number 3 at pages 626-634 in 1990. The extended Infomax is described, for example, in a paper by Te-Won Lee, Mark A. Girolami, and Terrence J. Sejnowski titled *Independent component analysis using an extended infomax algorithm for mixed subgaussian and supergaussian sources* and published in Neural Computation in volume 11 at pages 417-441 in 1999.

RPCA and ICA are used for very different purposes. RPCA is a robust version of PCA, so several applications focus on finding the principal components from this low-rank space, which is less sensitive to outliers compared to traditional PCA. For applications such as video surveillance and anomaly detection, the sparse matrix is more useful as it includes moving objects and the low-rank matrix includes the stationary background. The sparse matrix includes information about observations that lie away from the true low-rank space. The primary focus of ICA is identifying the latent sources. If the data is organized so that the different features are organized column wise, the primary focus of ICA is column wise to find a suitable linear combination of columns that may be of interest such as being an artifact; whereas, anomaly detection using RPCA is focused row wise on which rows of the sparse matrix have a larger than expected norm. As such, it is not natural to combine them.

Referring to FIG. 1, a block diagram of an anomaly detection device 100 is shown in accordance with an illustrative embodiment. Anomaly detection device 100 may include an input interface 102, an output interface 104, a communication interface 106, a non-transitory computer-readable medium 108, a processor 110, a training application 122, a training dataset 124, and a detection model description 126. Fewer, different, and/or additional components may be incorporated into anomaly detection device 100.

Anomaly detection application 122 performs RPCA to compute a projection of the observation vectors included in training dataset 124 using an orthogonal complement matrix of the low-rank matrix L. Anomaly detection application 122 performs ICA with the projected training data as input to compute a demixing matrix W. Anomaly detection application 122 further computes an anomaly detection threshold. Anomaly detection application 122 performs operations associated with defining detection model description 126 from data stored in training dataset 124. Some or all of the operations described herein may be embodied in anomaly detection application 122.

Input interface 102 provides an interface for receiving information from the user or another device for entry into anomaly detection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into anomaly detection device 100 or to make selections presented in a user interface displayed on display 116. The same interface may support both input interface 102 and output interface 104. For example, display 116 comprising a touch screen provides a mechanism for user input and for presentation of output to the user. Anomaly detection device 100 may have one or more input interfaces that use the same or a different input interface technology. The input interface technology further may be accessible by anomaly detection device 100 through communication interface 106.

Output interface 104 provides an interface for outputting information for review by a user of anomaly detection device 100 and/or for use by another application or device. For example, output interface 104 may interface with various output technologies including, but not limited to, display 116, a speaker 118, a printer 120, etc. Anomaly detection device 100 may have one or more output interfaces that use the same or a different output interface technology. The output interface technology further may be accessible by anomaly detection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Anomaly detection device 100 may have one or more communication interfaces that use the same or a different communication interface technology. For example, anomaly detection device 100 may support communication using an Ethernet port, a Bluetooth antenna, a telephone jack, a USB port, etc. Data and messages may be transferred between anomaly detection device 100 and a distributed computing system 132 using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Anomaly detection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Anomaly detection device 100 also may have one or more drives that support the loading of a memory media such as a CD, DVD, an external hard drive, etc. One or more external hard drives further may be connected to anomaly detection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Anomaly detection device 100 may include a plurality of processors that use the same or a different processing technology.

Referring to the example embodiment of FIG. 1, anomaly detection application 122 is implemented in software (comprised of computer-readable and/or computer-executable instructions) stored in computer-readable medium 108 and accessible by processor 110 for execution of the instructions that embody the operations of anomaly detection application 122. Anomaly detection application 122 may be written using one or more programming languages, assembly languages, scripting languages, etc. Anomaly detection application 122 may be integrated with other analytic tools. For example, anomaly detection application 122 may be part of SAS® Enterprise Miner™ developed and provided by SAS Institute Inc. of Cary, NC that may be used to create highly accurate predictive and descriptive models based on analysis of vast amounts of data from across an enterprise. Anomaly detection application 122 further may be part of SAS® Enterprise Guide, SAS® Visual Analytics, SAS® Visual Data Mining and Machine Learning, SAS® Visual Statistics, SAS® LASR™ Analytic Server, and/or SAS® Access Engine(s) also developed and provided by SAS Institute Inc. of Cary, NC, USA.

Anomaly detection application 122 is applicable in a variety of industries. For example, anomaly detection application 122 may be used to identify anomalies in voice data and image data, equipment diagnostic data, etc. For example, an equipment failure may be identified in equipment diagnostic data. Anomaly detection application 122 may be integrated with other data processing tools to automatically process data generated as part of operation of an enterprise, facility, system, device, etc., to identify an anomaly in the data, and to provide a warning or alert associated with the identification using input interface 102, output interface 104, and/or communication interface 106 so that appropriate action can be initiated in response to the identification. For example, medical images that include a tumor may be recognized by anomaly detection application 122 which triggers a notification message sent to a clinician that a tumor has been identified based on an anomaly determined in the image data.

Anomaly detection application 122 may be implemented as a Web application. For example, anomaly detection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records, and the columns may be referred to as variables. Training dataset 124 may be transposed. An observation vector $x_i$ may include a value for each of the plurality of variables associated with the observation vector having index i. Each variable of the plurality of variables may describe a characteristic of a physical object, such as a living thing, a vehicle, terrain, a computing device, a physical environment, etc. For example, if training dataset 124 include data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, training dataset 124 may include image data captured by medical imaging equipment (i.e., computed tomography image, magnetic resonance image, x-ray image, ultrasound image, etc.) of a body part of a living thing. Training dataset 124 may include a reference to image data that may be stored, for example, in an image file or in a video file.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Training dataset 124 may be stored on computer-readable medium 108 or on one or more computer-readable media of distributed computing system 132 and accessed by anomaly detection device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may be captured at different date/time points periodically, intermittently, when an event occurs, etc. Each record of training dataset 124 may include one or more date values and/or time values.

Training dataset 124 may include data captured at a high data rate such as 200 or more observations per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices. Some of these devices may be referred to as edge devices and may involve edge computing circuitry. These devices may provide a variety of stored or generated data, such as network data or data specific to the network devices themselves. Some data may be processed with an event stream processing engine, which may reside in the cloud or in an edge device before being stored in training dataset 124.

Training dataset 124 may be stored using one or more of various structures as known to those skilled in the art including one or more files of a file system, a relational database, one or more tables of a system of tables, a structured query language database, etc. on anomaly detection device 100 or on distributed computing system 132. Anomaly detection device 100 may coordinate access to training dataset 124 that is distributed across distributed computing system 132 that may include one or more computing devices that can communicate using a network. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. Some systems may use SAS In-Memory Statistics for Hadoop® to read big data once and analyze it several times by persisting it in-memory for the entire session. Some systems may be of other types and configurations.

Figure 2:
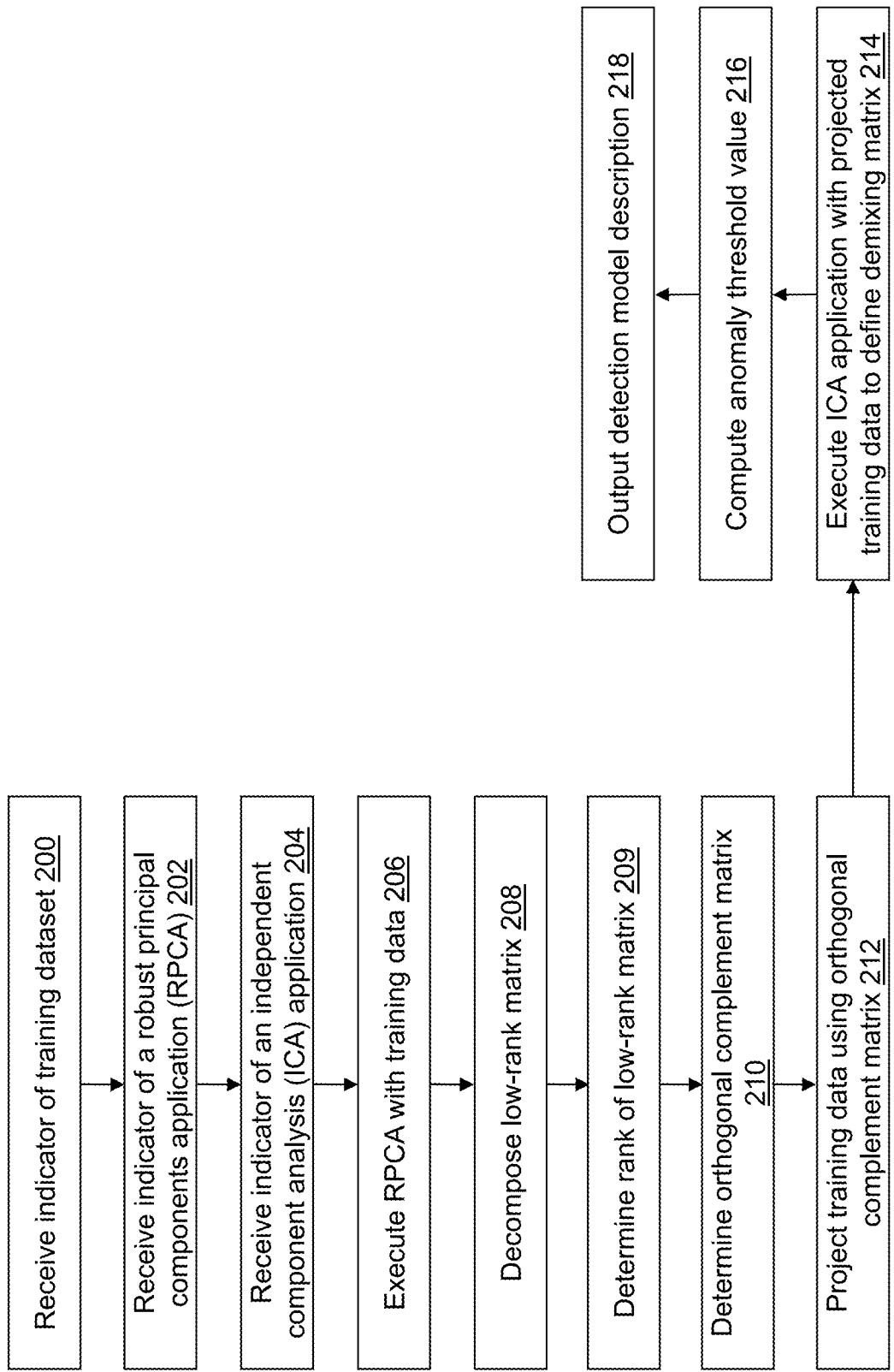
FIG. 2 depicts a flow diagram illustrating examples of operations performed by the anomaly detection device of FIG. 1 in accordance with an illustrative embodiment.

Referring to FIG. 2, example operations associated with anomaly detection application 122 are described. For example, anomaly detection application 122 may be used to create detection model description 126 from training dataset 124. Additional, fewer, or different operations may be performed depending on the embodiment of anomaly detection application 122. The order of presentation of the operations of FIG. 2 is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute anomaly detection application 122, which causes presentation of a first user interface window, which may include a plurality of menus and selectors such as drop down menus, buttons, text boxes, hyperlinks, etc. associated with anomaly detection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by anomaly detection application 122.

Referring to FIG. 2, in an operation 200, a first indicator may be received that indicates training dataset 124. For example, the first indicator indicates a location and a name of training dataset 124. As an example, the first indicator may be received by anomaly detection application 122 after selection from a user interface window or after entry by a user into a user interface window. In an alternative embodiment, training dataset 124 may not be selectable. For example, a most recently created dataset may be used automatically.

In an operation 202, a second indicator may be received that indicates an RPCA algorithm to apply. For example, the second indicator indicates a name of the RPCA algorithm to apply and any associated parameters used to define execution of the RPCA algorithm to apply executed with training dataset 124. The second indicator may be received by anomaly detection application 122 after selection from a user interface window or after entry by a user into a user interface window. The RPCA algorithm may be labeled or selected in a variety of different manners by the user as understood by a person of skill in the art. As an example, the RPCA algorithm to apply may be a SAS procedure RPCA, developed and provided by SAS Institute Inc. of Cary, NC, USA as part of the SAS® Visual Data Mining and Machine Learning Procedures. The SAS procedure RPCA implements the RPCA method. Robustness in RPCA comes from the property that the principal components are computed from observations after removing the anomalies, that is from the low-rank matrix L.

In an operation 204, a third indicator may be received that indicates an ICA algorithm to apply. For example, the third indicator indicates a name of the ICA algorithm to apply and any associated parameters used to define execution of the ICA algorithm to apply executed with training dataset 124. The third indicator may be received by anomaly detection application 122 after selection from a user interface window or after entry by a user into a user interface window. For example, the third indicator indicates a name of the ICA algorithm function or procedure and any associated parameters used to define execution of the ICA algorithm. A default value for the principal components function may further be stored, for example, in computer-readable medium 108. As an example, an ICA algorithm may be selected from "Fast-ICA", "Extended Infomax", etc. The ICA algorithm may be labeled or selected in a variety of different manners by the user as understood by a person of skill in the art. As an example, the ICA algorithm to apply may be a SAS procedure ICA, developed and provided by SAS Institute Inc. of Cary, NC, USA as part of the SAS® Visual Statistics Procedures. The SAS procedure ICA implements the Fast-ICA algorithm described in a paper by Aapo Hyvärinen and Erkki Oja titled *Independent Component Analysis: Algorithms and Applications* and published in Neural Networks in volume 13 at pages 411-430 in 2000.

In an operation 206, the RPCA algorithm is executed using some or all of the observation vectors included in training dataset 124 based on the RPCA algorithm and the parameters indicated in operation 202 to define the low-rank matrix L and the sparse matrix S. For illustration, operation 206 may be performed using the Robust PCA action set of SAS® Visual Data Mining and Machine Learning.

In an operation 208, the low-rank matrix L is decomposed, for example, using a singular value decomposition (SVD) such that $L=U\Sigma V^T$, where U is a left decomposition matrix, $\Sigma$ is a diagonal matrix of singular values, V is decomposition right matrix, and T indicates a transpose.

In an operation 209, a rank r of the low-rank matrix L is determined as a number of non-zero singular values in $\Sigma$ such that rank(L)=r.

In an operation 210, an orthogonal complement matrix N is determined from V as the remaining column vectors in V after the first r column vectors in V are removed.

In an operation 212, the training data used to execute the RPCA algorithm in operation 206 are projected using the orthogonal complement matrix N to define S'=TN where S' indicates the projected training data, and T indicates the training data used to execute the RPCA algorithm in operation 206. For illustration, operations 208, 209, 210, and 212 may be performed using SAS/IML®.

In an operation 214, the ICA algorithm is executed using S' based on the ICA algorithm and the parameters indicated in operation 204 to define the demixing matrix W. For illustration, operation 214 may be performed using the independent component analysis action set of SAS® Visual Statistics.

In an operation 216, an anomaly threshold value $T_{anomaly}$ is computed. For example, a predefined percentile of an L2 norm may be computed. For example, a demixed training matrix Q may be computed, for example, using $Q=S'W^T$. An L2 norm is computed on each row vector of the demixed training matrix Q to define a vector q. A predefined anomaly percentage value $A_p$ of the vector q is used to define the anomaly threshold value based on the rows of the L2 norm. For example, the vector q is sorted by increasing value. A percentile value can be associated with each row of the vector q. For example, a smallest L2 norm value has a percentile value defined as $$\frac{1}{N}*100,$$

where N indicates a number of rows of the vector q; a largest L2 norm value has a percentile value defined as $$\frac{N}{N}*100.$$

The L2 norm value having a percentile value that is greater than the predefined anomaly percentage value $A_p$ is selected as the anomaly threshold value $T_{anomaly}$. The L2 norm indicated by $\| \|_2$ is a Euclidean distance computed using $$\sqrt{\sum_{i=1}^{N} x_i^2},$$

where x indicates a vector from which the L2 norm is being computed, and N indicates a number of dimensions of x. The predefined anomaly percentage value $A_p$ may be definable by a user. Other methods may be used for computing $T_{anomaly}$. For example, a mean value and a standard deviation value of Q may be computed. $T_{anomaly}=\mu+p\sigma$, where $\mu$ indicates the mean value, $\sigma$ indicates the standard deviation value, and p indicates a predefined number of standard deviations. The predefined number of standard deviations p may be definable by a user. In another illustrative embodiment, Shewhart control charts may be used.

In an operation 218, the trained detection model is stored to detection model description 126. The data that describes the trained detection model may be stored in computer-readable medium 108 and/or on one or more computing devices of distributed computing system 132 in a variety of formats as understood by a person of skill in the art. For illustration, the trained detection model may be stored using the ASTORE procedure provided by SAS® Visual Data Mining and Machine Learning software. In an illustrative embodiment, the computed anomaly threshold value $T_{anomaly}$, the orthogonal complement matrix N, and the demixing matrix W are output to detection model description 126 to describe the trained detection model.

Figure 3:
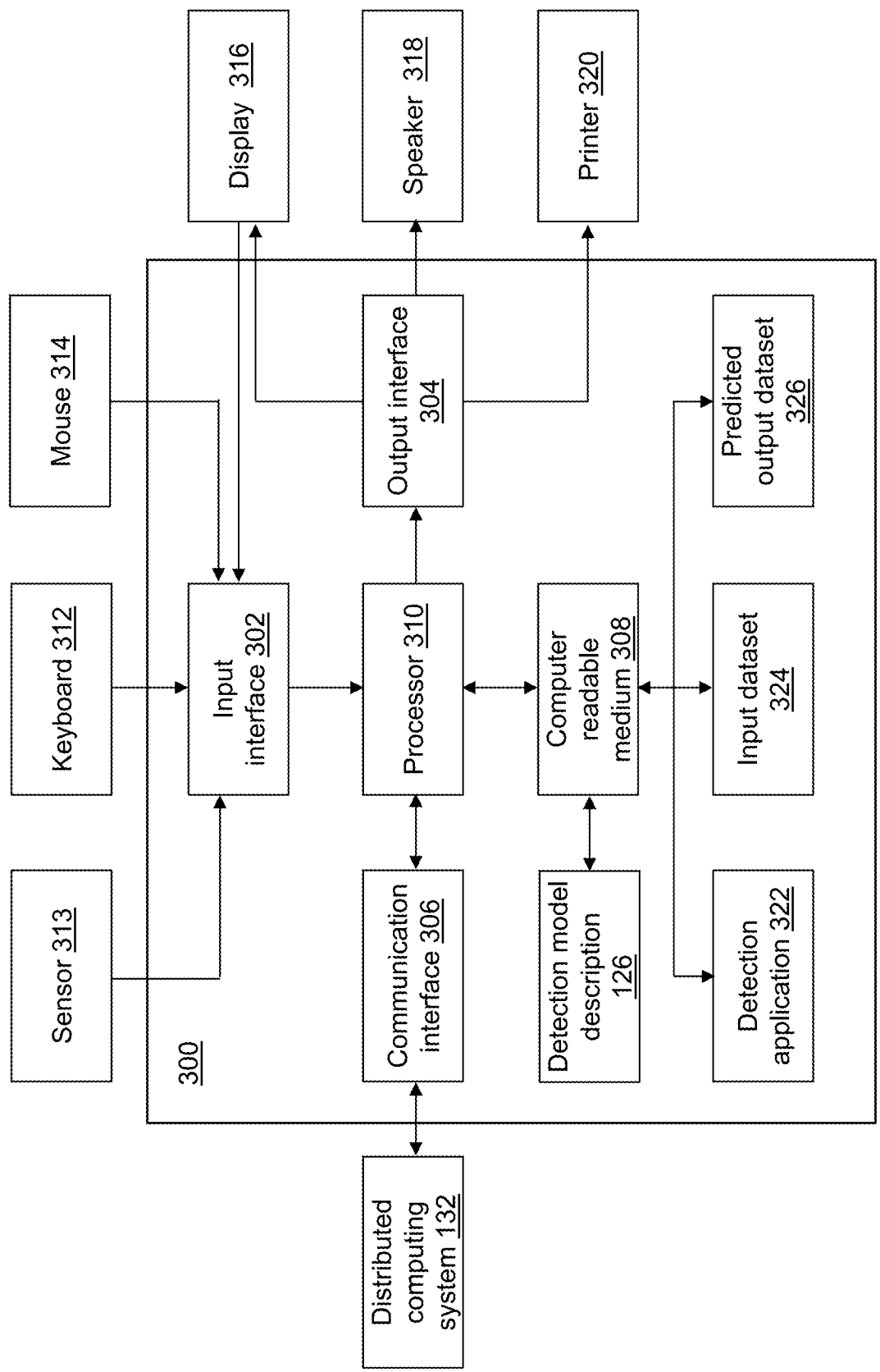
FIG. 3 depicts a block diagram of a detection device that uses a trained detection model to identify an anomaly in accordance with an illustrative embodiment.

Referring to FIG. 3, a block diagram of a detection device 300 is shown in accordance with an illustrative embodiment. Detection device 300 may include a second input interface 302, a second output interface 304, a second communication interface 306, a second non-transitory computer-readable medium 308, a second processor 310, a detection application 322, detection model description 126, an input dataset 324, and predicted output dataset 326. Fewer, different, and/or additional components may be incorporated into detection device 300. Detection device 300 and anomaly detection device 100 may be the same or different devices.

Second input interface 302 provides the same or similar functionality as that described with reference to input interface 102 of anomaly detection device 100 though referring to detection device 300. Second output interface 304 provides the same or similar functionality as that described with reference to output interface 104 of anomaly detection device 100 though referring to detection device 300. Second communication interface 306 provides the same or similar functionality as that described with reference to communication interface 106 of anomaly detection device 100 though referring to detection device 300. Data and messages may be transferred between detection device 300 and distributed computing system 132 using second communication interface 306. Second computer-readable medium 308 provides the same or similar functionality as that described with reference to computer-readable medium 108 of anomaly detection device 100 though referring to detection device 300. Second processor 310 provides the same or similar functionality as that described with reference to processor 110 of anomaly detection device 100 though referring to detection device 300.

Detection application 322 performs operations associated with detecting an anomaly included in input dataset 324 using detection model description 126 based on values for the variables of each observation vector stored in input dataset 324. In an alternative embodiment, detection application 322 performs operations associated with detecting an anomaly included in observation vectors streamed to detection device 300 or otherwise received from another device such as an IoT device. Dependent on the type of data stored in input dataset 324, detection application 322 may identify anomalies as part of process control, for example, of a manufacturing process, classify images, for example, those produced by an electro-cardiogram device, identify a fraudulent transaction, identify a health alert, for example, of a patient using health sensors, identify a cybersecurity attack using network traffic, etc. Some or all of the operations described herein may be embodied in detection application 322. The operations may be implemented using hardware, firmware, software, or any combination of these methods.

Referring to the example embodiment of FIG. 3, detection application 322 is implemented in software (comprised of computer-readable and/or computer-executable instructions) stored in second computer-readable medium 308 and accessible by second processor 310 for execution of the instructions that embody the operations of detection application 322. Detection application 322 may be written using one or more programming languages, assembly languages, scripting languages, etc. Detection application 322 may be integrated with other analytic tools. For example, detection application 322 may be implemented using or integrated with one or more SAS software tools such as JMP, Base SAS, SAS/STAT, SAS Enterprise Miner, SAS® High Performance Analytics Server, SAS LASR, SAS In-Database Products, SAS Scalable Performance Data Engine, SAS/OR, SAS/ETS, SAS Inventory Optimization, SAS Inventory Optimization Workbench, SAS® Visual Analytics, SAS® Visual Data Mining and Machine Learning, SAS Viya, SAS In-Memory Statistics for Hadoop, SAS Forecast Server, all of which are developed and provided by SAS Institute Inc. of Cary, North Carolina, USA. One or more operations of detection application 322 further may be performed using an event stream processor such as the SAS® Event Stream Processing Engine (ESPE), developed and provided by SAS Institute Inc. of Cary, North Carolina, USA. Detection application 322 and anomaly detection application 122 further may be integrated applications.

Detection application 322 may be implemented as a Web application. Detection application 322 may be integrated with other system processing tools to automatically process data generated as part of operation of an enterprise using second input interface 302, second output interface 304, and/or second communication interface 306 so that appropriate action can be initiated in response. For example, a warning or an alert may be presented using a second display 316, a second speaker 318, a second printer 320, etc. or sent to one or more computer-readable media, display, speaker, printer, etc. of distributed computing system 132 based on predicted values for the response variable.

Input dataset 324 may be generated, stored, and accessed using the same or different mechanisms as those described referring to training dataset 124. Similar to training dataset 124, input dataset 324 may include a plurality of rows and a plurality of columns with the plurality of rows referred to as observation vectors or records, and the columns referred to as variables that are associated with an observation. Input dataset 324 may be transposed.

Similar to training dataset 124, input dataset 324 may be stored on second computer-readable medium 308 or on one or more computer-readable media of distributed computing system 132 and accessed by detection device 300 using second communication interface 306. Data stored in input dataset 324 may be a sensor measurement or a data communication value, for example, from a sensor 313, may be generated or captured in response to occurrence of an event or a transaction, generated by a device such as in response to an interaction by a user with the device, for example, from a second keyboard 312 or a second mouse 314, etc. The data stored in input dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 324 may be captured at different time points periodically, intermittently, when an event occurs, etc. One or more columns may include a time value. Similar to training dataset 124, data stored in input dataset 324 may be generated as part of the IoT, and some or all data may be pre- or post-processed by an ESPE.

Similar to training dataset 124, input dataset 324 may be stored in various compressed formats such as a coordinate format, a compressed sparse column format, a compressed sparse row format, etc. Input dataset 324 further may be stored using various structures as known to those skilled in the art including a file system, a relational database, a system of tables, a structured query language database, etc. on anomaly detection device 100, on detection device 300, and/or on distributed computing system 132. Detection device 300 and/or distributed computing system 132 may coordinate access to input dataset 324 that is distributed across a plurality of computing devices. For example, input dataset 324 may be stored in a cube distributed across a grid of computers as understood by a person of skill in the art. As another example, input dataset 324 may be stored in a multi-node Hadoop cluster. As another example, input dataset 324 may be stored in a cloud of computers and accessed using cloud computing technologies, as understood by a person of skill in the art. The SAS LASR Analytic Server and/or SAS Viya may be used as an analytic platform to enable multiple users to concurrently access data stored in input dataset 324.

Again, in an alternative embodiment, one or more observation vectors may be streamed to or received by detection device 300 in addition to or in the alternative to storing and reading the observation vectors from input dataset 324.

Figure 4:
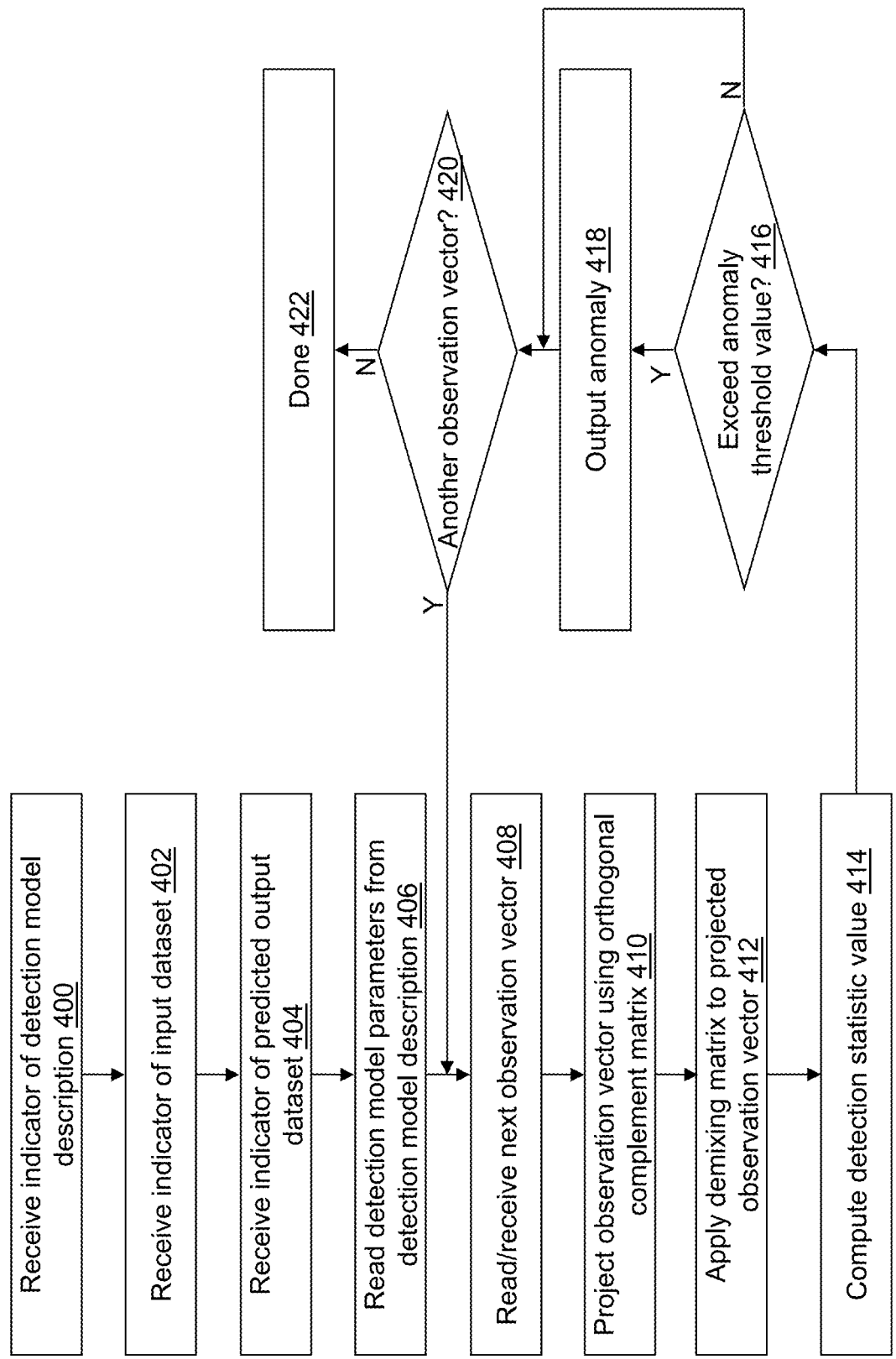
FIG. 4 depicts a flow diagram illustrating examples of operations performed by the detection device of FIG. 3 in accordance with an illustrative embodiment.

Referring to FIG. 4, example operations of detection application 322 are described. Additional, fewer, or different operations may be performed depending on the embodiment of detection application 322. The order of presentation of the operations of FIG. 4 is not intended to be limiting. Although some of the operational flows are presented in sequence, the various operations may be performed in various repetitions, concurrently (in parallel, for example, using threads and/or distributed computing system 132), and/or in other orders than those that are illustrated.

In an operation 400, a fourth indicator may be received that indicates detection model description 126. For example, the fourth indicator indicates a location and a name of detection model description 126. As an example, the fourth indicator may be received by detection application 322 after training using training application 122 from a user interface window or after entry by a user into a user interface window. In an alternative embodiment, detection model description 126 may not be selectable. For example, a most recently created predictive model description from operations 206 through 216 may be used automatically.

In an operation 402, a fifth indicator may be received that indicates input dataset 324. For example, the fifth indicator indicates a location and a name of input dataset 324. As an example, the fifth indicator may be received by detection application 322 after entry by a user into a user interface window. In an alternative embodiment, input dataset 324 may not be selectable. For example, a most recently created dataset may be used automatically or one or more observation vectors may be received by detection device 300, for example, in an established event stream from an event publishing device.

In an operation 404, a sixth indicator may be received that indicates predicted output dataset 326. For example, the sixth indicator indicates a location and a name of predicted output dataset 326. As an example, the sixth indicator may be received by detection application 322 after entry by a user into a user interface window. In an alternative embodiment, predicted output dataset 326 may not be selectable. For example, a default name and location for predicted output dataset 326 may be used automatically or one or more observation vectors may be sent to from an event subscribing device, for example, in a second established event stream.

In an operation 406, detection model parameters are read from detection model description 126. For example, the computed anomaly threshold value $T_{anomaly}$, the orthogonal complement matrix N, and the demixing matrix W are read from detection model description 126 to describe the trained detection model. Alternatively, the trained detection model may be instantiated using the ASTORE procedure, for example, as described in U.S. Pat. No. 9,619,491.

In an operation 408, an observation vector is read from a next line of input dataset 324 or optionally is received from another device, for example, in an event stream where detection device 300 has instantiated and is executing an ESPE.

In an operation 410, the read or received observation vector is projected using the orthogonal complement matrix N to define a projected observation vector using $x_p=xN$, where x indicates the read or received observation vector, and $x_p$ indicates the projected observation vector.

In an operation 412, the demixing matrix W is applied to the projected observation vector to define a demixed observation vector using $v=x_p W^T$, where v indicates the demixed observation vector.

In an operation 414, a detection statistic value s is computed from the demixed observation vector. For example, an L2 norm of the demixed observation vector is computed to define $s=\|v\|_2$, where the L2 norm is a square root of a sum of the squared vector values of v. Other norms and statistical values may be used that are associated with the computation of T anomaly used in operation 216.

In an operation 416, a determination is made concerning whether the detection statistic value s exceeds the anomaly threshold value $T_{anomaly}$. For example, when $s \geq T_{anomaly}$, the detection statistic value s exceeds the anomaly threshold value, and processing continues in an operation 418. When $s<T_{anomaly}$, processing continues in an operation 420.

In operation 418, the read or received observation vector x is labeled as an anomaly or an outlier and is output, for example, by storing an indicator in predicted output dataset 326. In addition, or in the alternative, the indicator may be sent to another computing device, for example, in an event stream to an event subscribing device. Additional values, such as x, s, v, or $x_p$ may also be output. The identified anomaly may be output using second display 316, second speaker 318, second printer 320, or may be output to another device using distributed computing system 132. For example, an alert message may be sent to a smart phone based on the anomaly identified.

In operation 420, a determination is made concerning whether there is another observation vector to process. When there is another observation vector to process, processing continues in operation 408. For example, if the event stream remains active, processing may continue to operation 408 to wait for receipt of another observation vector, for example, from an ESPE. When there is not another observation vector to process, processing continues in an operation 422.

In operation 422, detection of anomalies is complete.

Figure 5A:
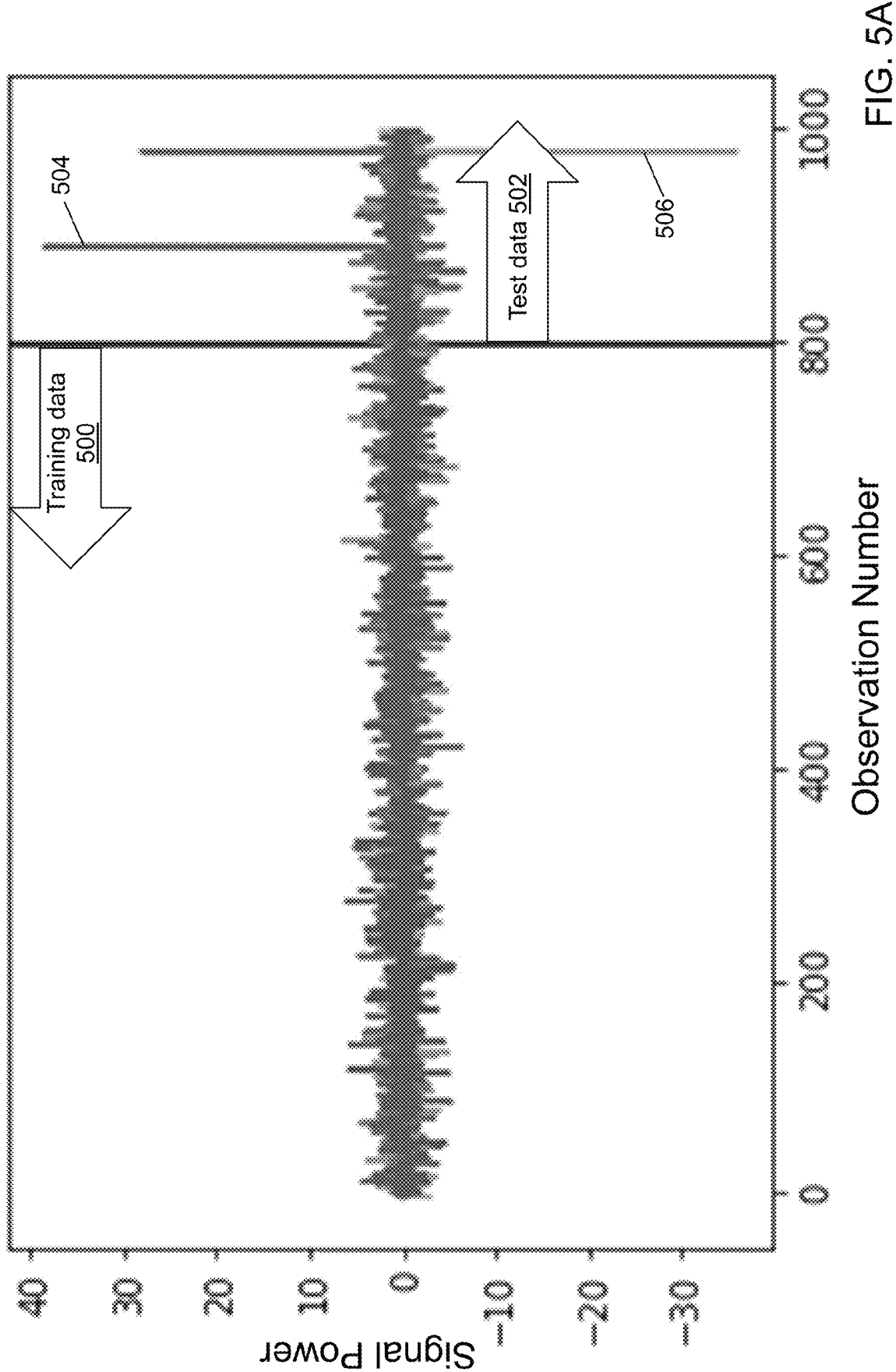
FIG. 5A depicts sample signal data in accordance with an illustrative embodiment.

Experimental results were generated by applying detection application 322 after applying training application 122 to train a detection model. In a first experiment, 1000 observation vectors were generated with the first 800 observation vectors used for training and the remaining 200 observation vectors used for testing. Four independent Laplacian sources were simulated with 1000 observations and two anomalies. Referring to FIG. 5A, the generated sample signal data is shown for the four sources. The 800 observations included in the training data are indicated by training data 500. The remaining 200 observation vectors are indicated by test data 502. Thus, the black line indicates where the training data stopped and the testing data started in time. A first anomaly 504 and a second anomaly 506 are shown. Second anomaly 506 included upward and downward spikes that were generated at the same time point for two of the four sources. Each of the four signal sources is shown with either a blue line, an orange line, a green line, or a red line as a function of time.

Figure 5B:
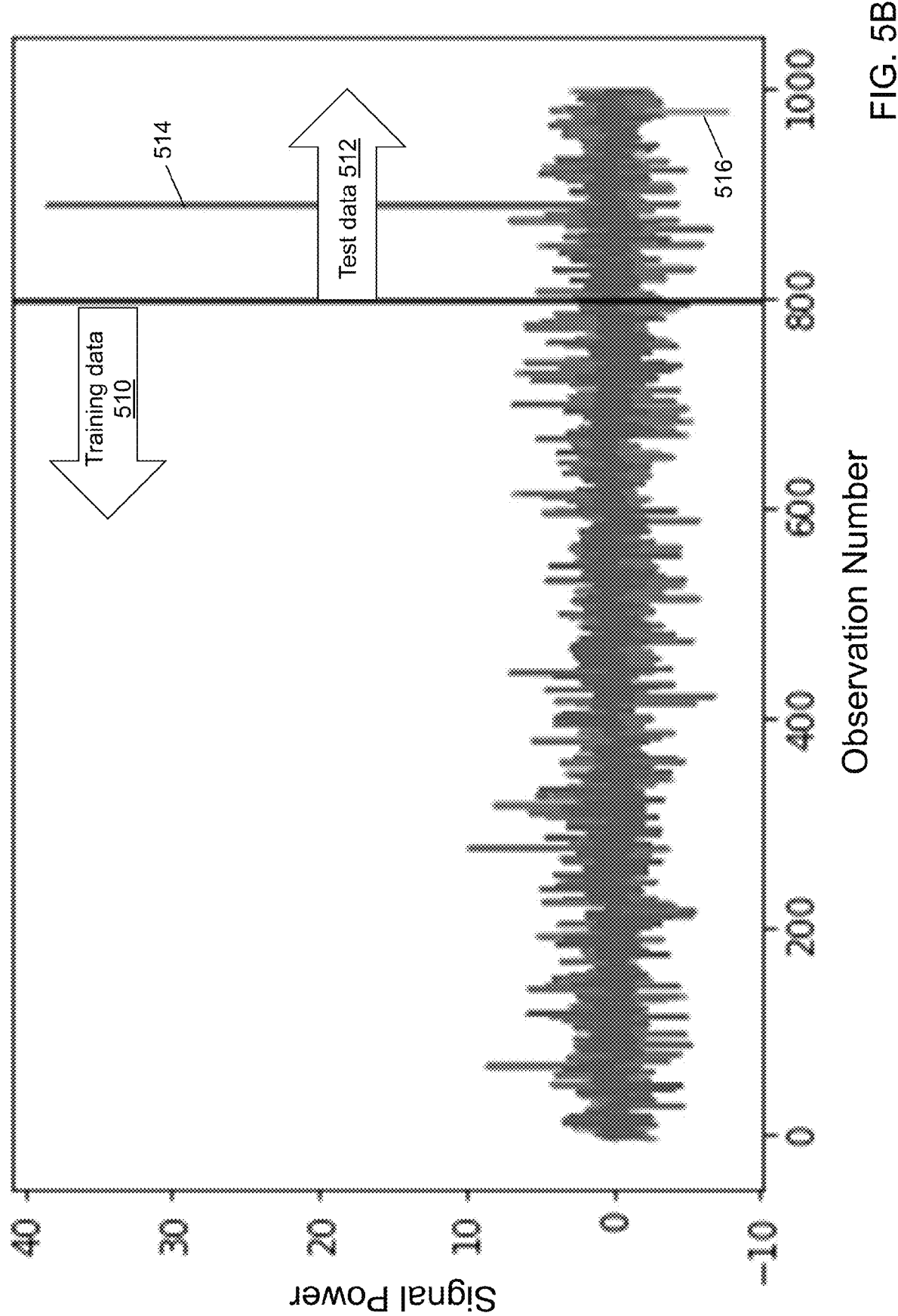
FIG. 5B depicts the sample signal data of FIG. 5B transformed in accordance with an illustrative embodiment.

More realistic data was generated by applying a linear map to generate a dataset where the features are mixed up to simulate sensor readings that provide a mixture of true latent features. Each observation vector includes four values with a value for each signal source as well as a time value. Referring to FIG. 5B, the transformed sample signal data is shown for the four sources. The 800 observations included in the training data are indicated by transformed training data 510 and were used to train the detection model using training application 122. The remaining 200 observation vectors included to test the trained model are indicated by transformed test data 512 and were used to test the trained detection model using detection application 322. First anomaly 504 is shown as first transformed anomaly 514 and second anomaly 506 is shown as second transformed anomaly 516.

Figure 6A:
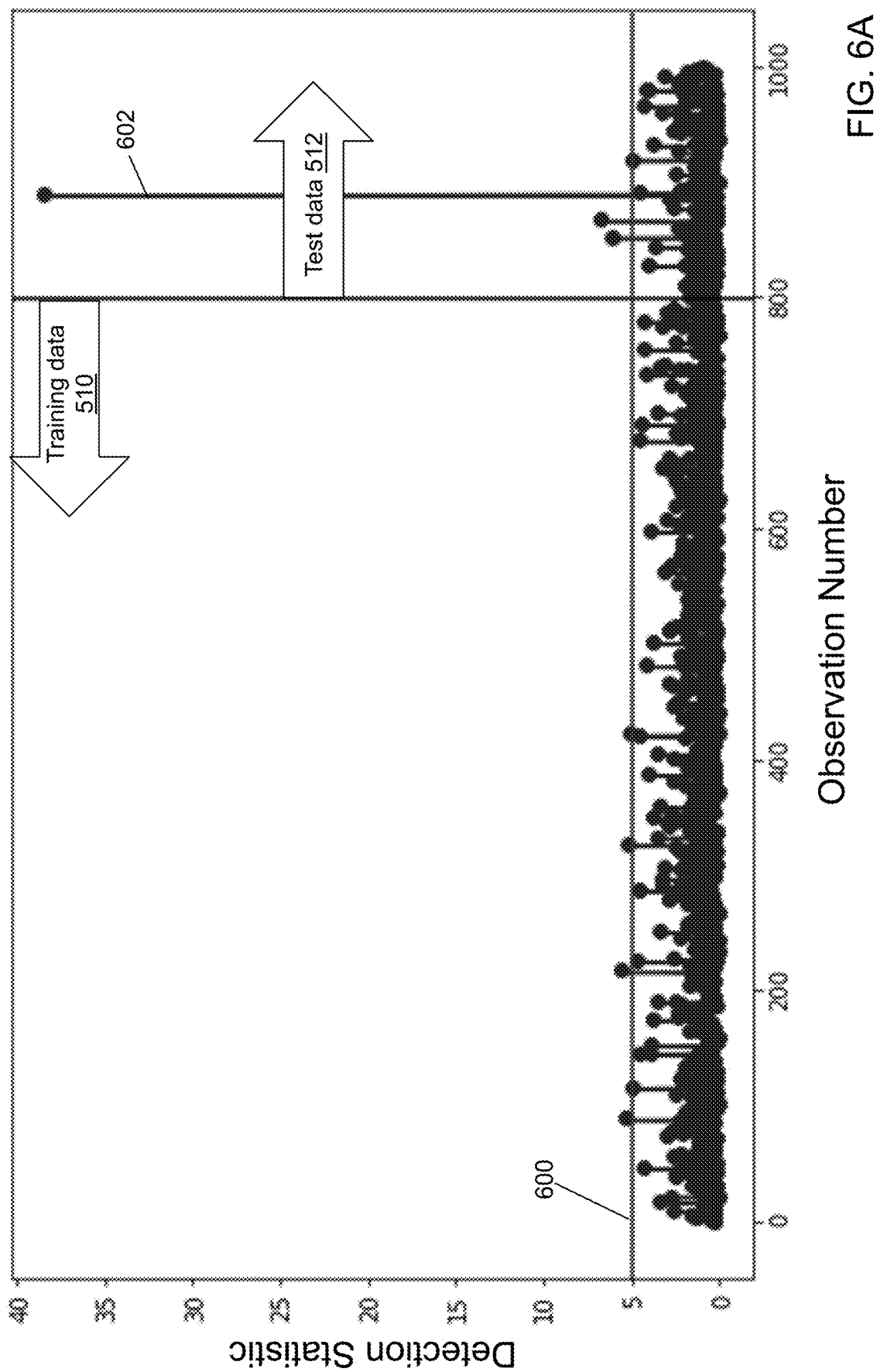
FIG. 6A depicts a detection statistic computed for the sample signal data of FIG. 5 using an existing robust principal component analysis (RPCA) algorithm in accordance with an illustrative embodiment.

The existing RPCA algorithm was trained with transformed training data 510 and executed with the transformed test data 512 using the anomaly threshold value $T_{anomaly}$ indicated by a first threshold line 600. Referring to FIG. 6A, the detection statistic value computed by the existing RPCA algorithm using the L2 norm is shown for each observation vector. The existing RPCA algorithm only detected first transformed anomaly 514 as shown by a first detection statistic value 602 that well exceeds the anomaly threshold value $T_{anomaly}$.

Figure 6B:
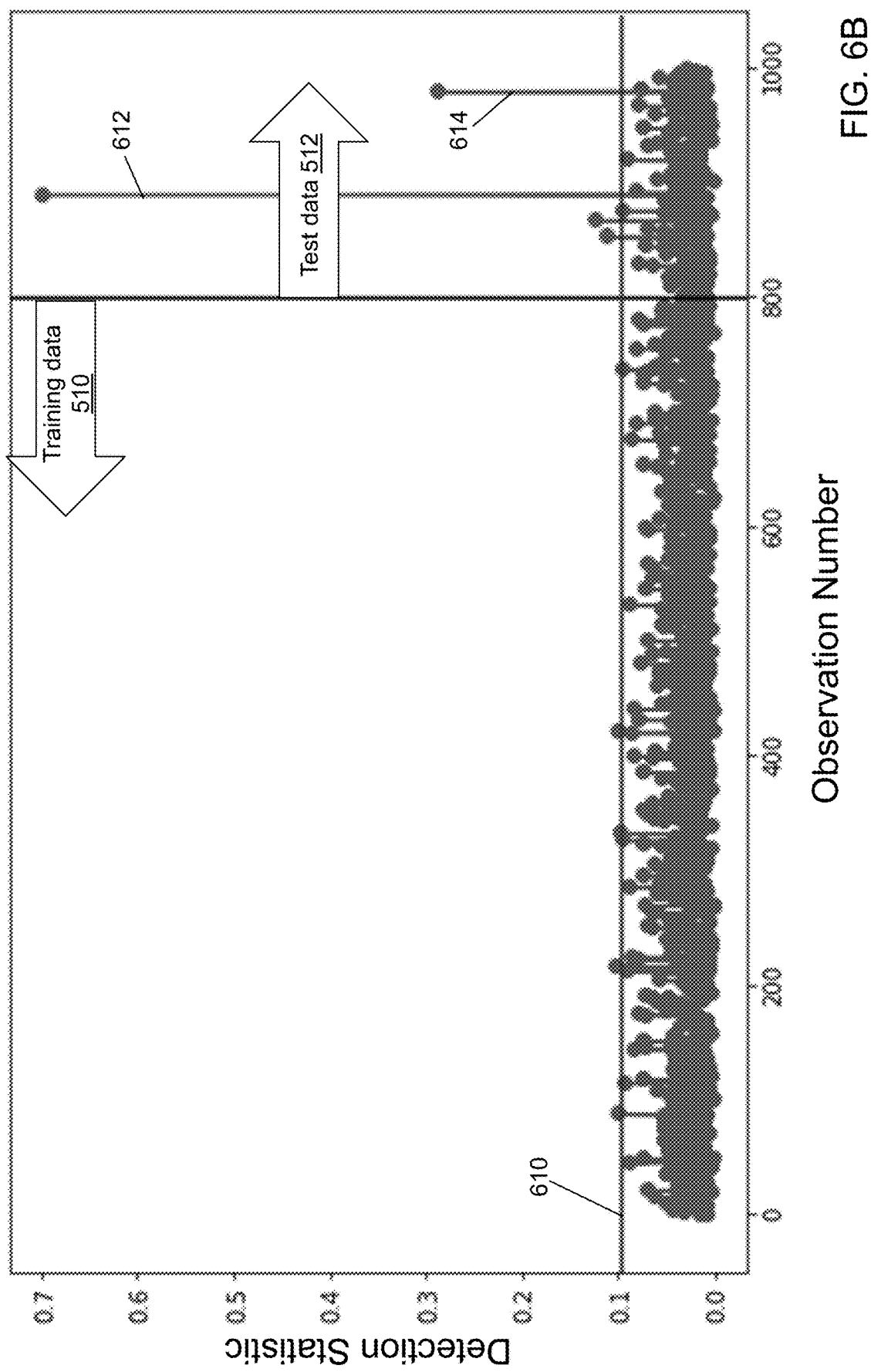
FIG. 6B depicts the detection statistic computed for the sample signal data of FIG. 5 using the trained detection model to identify an anomaly with an extended Infomax independent component analysis (ICA) algorithm in accordance with an illustrative embodiment.

Training application 122 was executed with transformed training data 510 using the existing RPCA algorithm combined with the extended Infomax algorithm ICA algorithm (RPCA-Infomax ICA). Detection application 322 was executed with the resulting predictive model trained using RPCA-Infomax ICA and the transformed test data 512 using the anomaly threshold value $T_{anomaly}$ indicated by a second threshold line 610. Referring to FIG. 6B, the detection statistic value computed by the RPCA-Infomax ICA using the L2 norm is shown for each observation vector. The RPCA-Infomax ICA detected first transformed anomaly 514 as shown by a second detection statistic value 612 that well exceeds the anomaly threshold value $T_{anomaly}$ and second transformed anomaly 516 as shown by a third detection statistic value 614 that well exceeds the anomaly threshold value $T_{anomaly}$. A comparison between the false alarms generated using each algorithm can be seen based on a number of observations other than the anomalous observations that exceeded the anomaly threshold value $T_{anomaly}$ in FIGS. 6A, 6B, and 6C.

Training application 122 was executed with transformed training data 510 using the existing RPCA algorithm combined with the Fast-ICA algorithm (RPCA-FastICA). Detection application 322 was executed with the resulting predictive model trained using RPCA-FastICA and the transformed test data 512 using the anomaly threshold value $T_{anomaly}$ indicated by a third threshold line 620. Referring to FIG. 6C, the detection statistic value computed by detection application 322 based on the RPCA-FastICA algorithm using the L2 norm is shown for each observation vector. Detection application 322 detected first transformed anomaly 514 as shown by a fourth detection statistic value 622 that well exceeds the anomaly threshold value $T_{anomaly}$ and second transformed anomaly 516 as shown by a fifth detection statistic value 624 that well exceeds the anomaly threshold value $T_{anomaly}$.

A chemical process as described in a paper by J. J. Downs and E. F. Vogel titled *A Plant-Wide Industrial Process Control Problem* and published in Computers & Chemical Engineering, Volume 17, Number 3 pages 245-255 in 1993 (Downs) was simulated in a second experiment. The chemical process provides a realistic scenario with multiple disturbances or anomalies affecting the operation as discussed on page 250 of Downs. The overall process includes five operating units: reactor, condenser, vapor liquid separator, recycle compressor, and product stripper. The chemical process takes four input streams of chemicals (A, C, D, and E) and produces two products and one byproduct using a sequence of processors as shown in FIG. 1 on page 246 of Downs.

A chemical dataset created from the chemical process data included twenty-two observed variables were measured every minute, fourteen variables were measured every six minutes, and five variables were measured every fifteen minutes resulting in 41 variables measured to assist in detecting the faults. The chemical dataset further included twelve manipulated variables. The chemical dataset further included twenty faults or process disturbances. A fault indicated by fault number zero indicates the non-anomalous data.

Figure 7A:
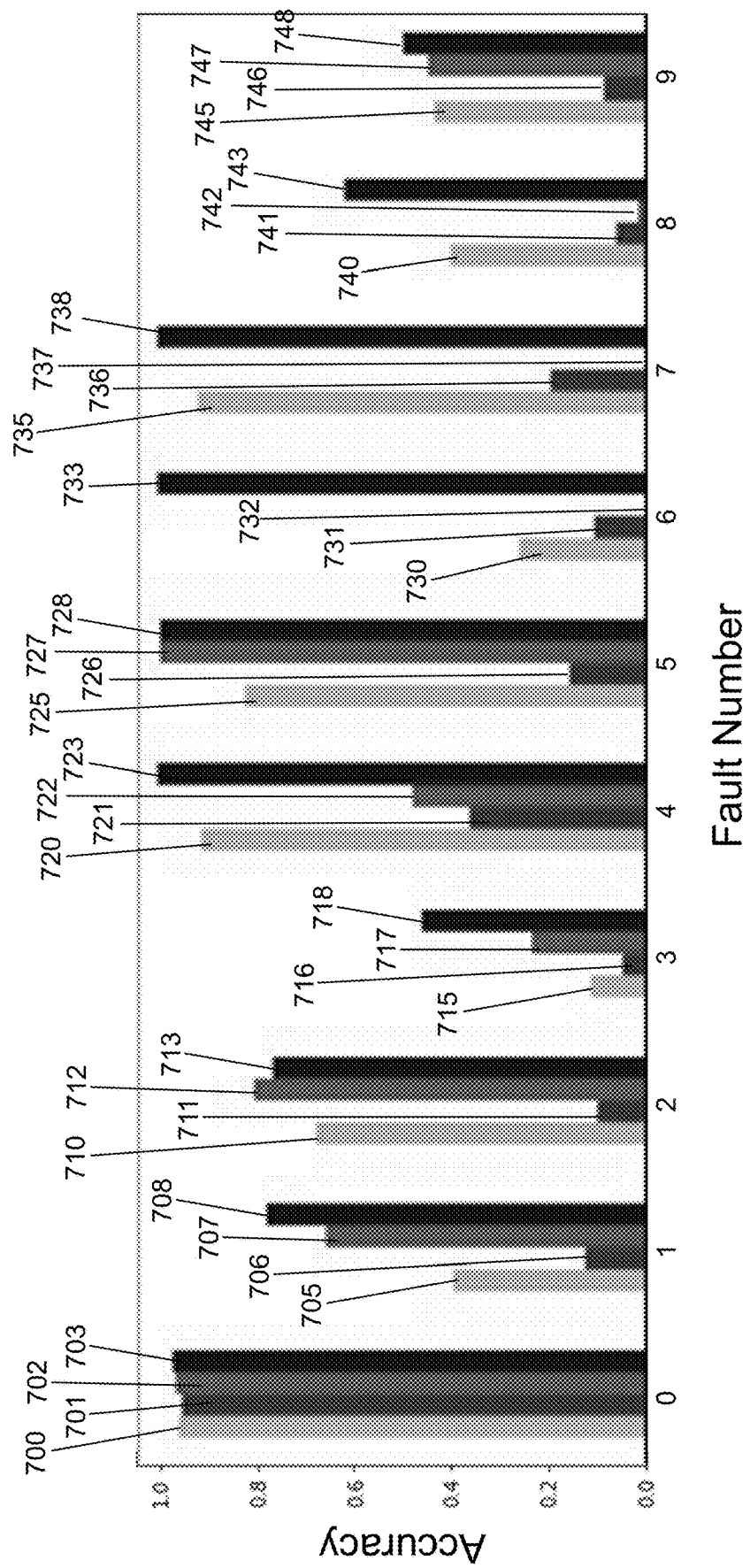
FIGS. 7A and 7B depict a histogram of accuracy values computed for twenty-one faults included in a dataset using four different algorithms in accordance with illustrative embodiments.
Figure 7B:
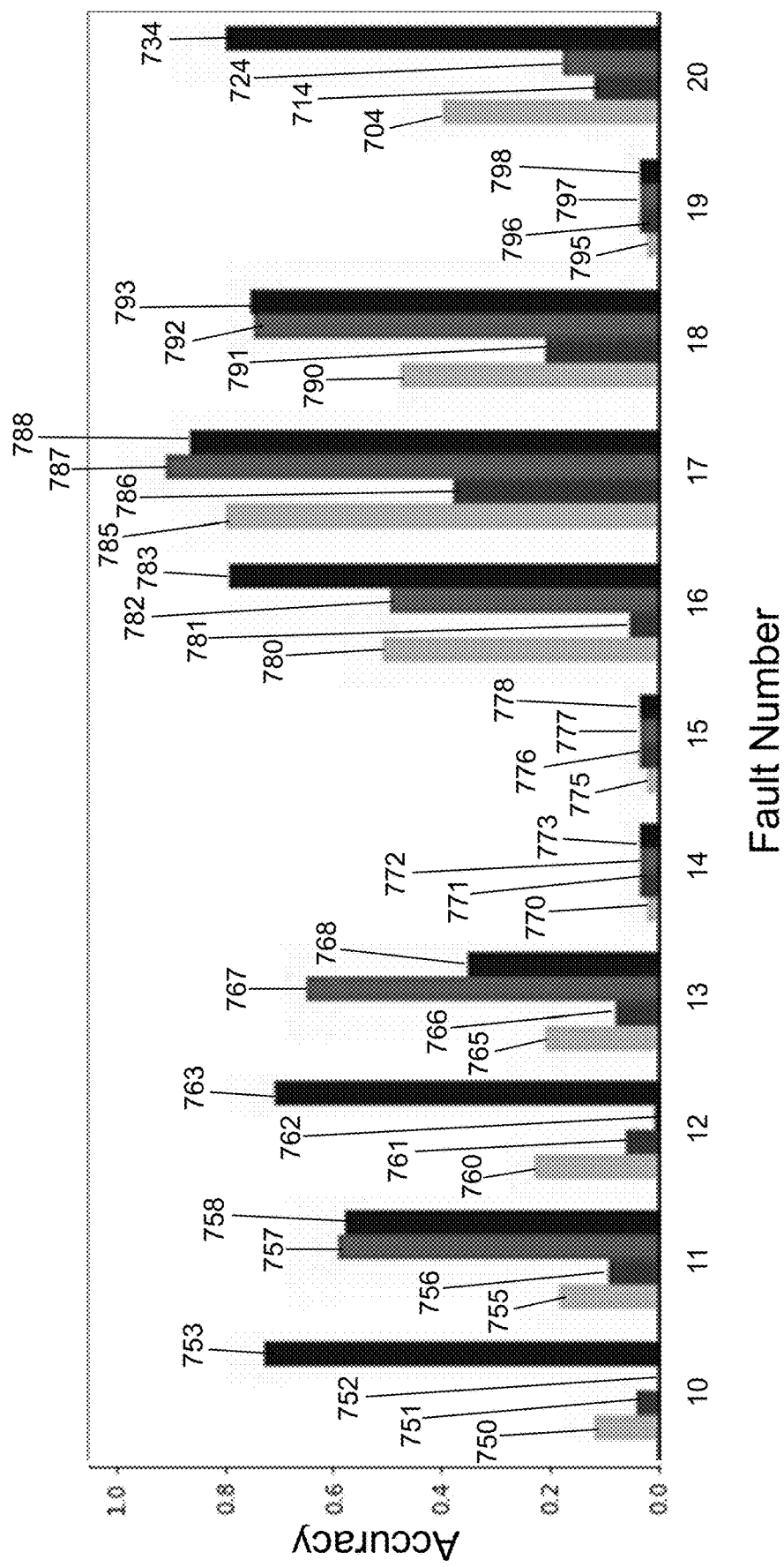

The chemical dataset was randomly split into a training dataset and a test dataset with half the observation vectors included in each of the datasets. Each of a support vector data description (SVDD) algorithm, the existing RPCA algorithm, the Fast-ICA algorithm, and the RPCA-FastICA algorithm was executed to train a detection model using the training dataset, and the trained model was executed with the test dataset to generate accuracy results. The RPCA-FastICA algorithm represents an example of detection application 322 where the detection model was trained using the RPCA-FastICA algorithm. The SAS procedure SVDD, developed and provided by SAS Institute Inc. of Cary, NC, USA as part of the SAS® Visual Data Mining and Machine Learning Procedures was used for the SVDD algorithm. Referring to FIGS. 7A and 7B, the accuracy results are shown for each algorithm for each of the 21 different fault classes. Histogram bars 700, 705, 710, 715, 720, 725, 730, 735, 740, 745, 750, 755, 760, 765, 770, 775, 780, 785, 790, 795, and 704 show the accuracy using the SVDD algorithm for fault numbers 0 through 20. Histogram bars 701, 706, 711, 716, 721, 726, 731, 736, 741, 746, 751, 756, 761, 766, 771, 776, 781, 786, 791, 796, and 714 show the accuracy using the RPCA algorithm for fault numbers 0 through 20. Histogram bars 702, 707, 712, 717, 722, 727, 732, 737, 742, 747, 752, 757, 762, 767, 772, 777, 782, 787, 792, 797, and 724 show the accuracy using the Fast-ICA algorithm for fault numbers 0 through 20. Histogram bars 703, 708, 713, 718, 723, 728, 733, 738, 743, 748, 753, 758, 763, 768, 773, 778, 783, 788, 793, 798, and 734 show the accuracy using detection application 322 with the detection model trained using the RPCA-FastICA algorithm for fault numbers 0 through 20.

Faults 14, 15, and 19 contain data that is very similar to normal data. Because of this, use of all four algorithms results in low accuracy. Detection application 322 with the detection model trained using the RPCA-FastICA algorithm performed better than or at least very similar to the other three existing algorithms for 17 of the 21 faults classes. For fault numbers 2, 11, 13, and 17, detection application 322 with the detection model trained using the RPCA-FastICA algorithm performed better though only the performance for fault number 13 was significantly poorer. However, detection application 322 with the detection model trained using the RPCA-FastICA algorithm showed much more consistent performance relative to the other methods as shown in Table 1 shown below. The second column of Table 1 is titled the "Difference in accuracy value" and indicates the difference in accuracy between detection application 322 with the detection model trained using the RPCA-FastICA algorithm and whichever of the other three existing algorithms provided the highest accuracy for the respective fault.

TABLE 1

| Fault Number | Difference in accuracy value |
|---|---|
| 0 | 0.341297 |
| 1 | 12.28669 |
| 2 | 3.578529 |
| 3 | 22.546012 |
| 4 | 8.933002 |
| 5 | −0.166113 |
| 6 | 74.551971 |
| 7 | 8.333333 |
| 8 | 22.163589 |
| 9 | 5.464481 |
| 10 | 60.176341 |
| 11 | −1.617251 |
| 12 | 47.887324 |
| 13 | −29.525862 |
| 14 | −0.289351 |
| 15 | −0.289351 |
| 16 | 27.871772 |
| 17 | −4.456967 |
| 18 | 0.804598 |
| 19 | −0.289351 |
| 20 | 39.877717 |

As shown by Table 1, detection application 322 with the detection model trained using the RPCA-FastICA algorithm performed better than or similar to the other three existing algorithms for all of the faults except Fault 13. As a result, detection application 322 with the detection model trained using the RPCA-FastICA algorithm provided much more consistent performance across all of the different faults.

A modified National Institute of Standards and Technology (MNIST) image dataset included in the ODDS collection of anomaly detection datasets was simulated in a third experiment. The image dataset included 60,000 images of 10 classes of handwritten digits zero through nine. Digit zero was considered normal data and digit six was considered an anomaly. The MNIST dataset was randomly split into a training dataset and a test dataset with half the observation vectors included in each of the datasets. Each of the SVDD algorithm, the existing RPCA algorithm, the Fast-ICA algorithm, and the RPCA-FastICA was executed to train a detection model using the training dataset, and the trained model was executed with the test dataset to generate accuracy results.

Figure 8:
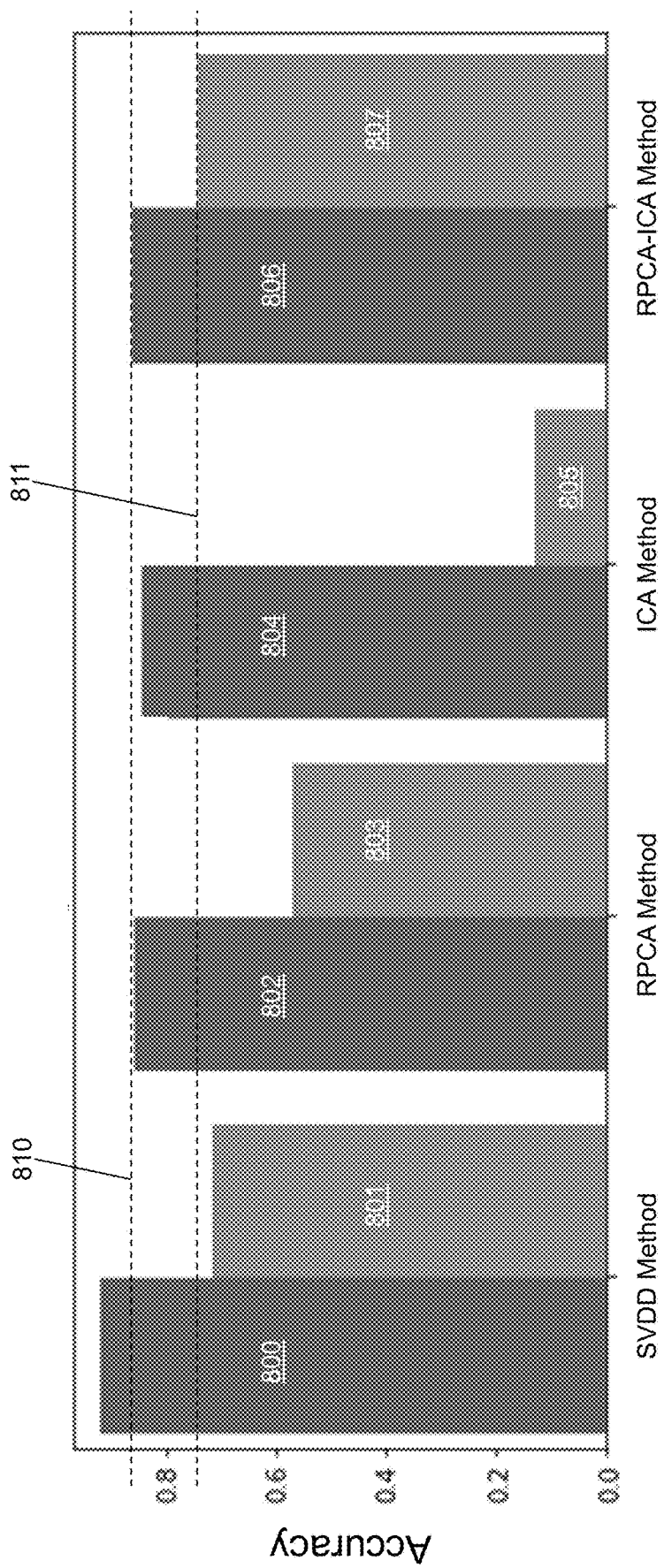
FIG. 8 depicts a histogram of accuracy values computed for normal and anomalous observation vectors included in a second dataset using the four different algorithms in accordance with illustrative embodiments.

Referring to FIG. 8, the accuracy results are shown for each algorithm for anomalous and non-anomalous observation vectors. A first histogram bar 800 shows the accuracy using the SVDD algorithm for non-anomalous observation vectors, and a second histogram bar 801 shows the accuracy using the SVDD algorithm for anomalous observation vectors. A third histogram bar 802 shows the accuracy using the existing RPCA algorithm for non-anomalous observation vectors, and a fourth histogram bar 803 shows the accuracy using the existing RPCA algorithm for anomalous observation vectors. A fifth histogram bar 804 shows the accuracy using the Fast-ICA algorithm for non-anomalous observation vectors, and a sixth histogram bar 805 shows the accuracy using the Fast-ICA algorithm for anomalous observation vectors. A seventh histogram bar 806 shows the accuracy using detection application 322 with the detection model trained using the RPCA-FastICA algorithm for non-anomalous observation vectors, and an eighth histogram bar 807 shows the accuracy using detection application 322 with the detection model trained using the RPCA-FastICA algorithm for anomalous observation vectors.

A first line 810 shows the accuracy for non-anomalous observation vectors using detection application 322 with the detection model trained using the RPCA-FastICA algorithm. A second line 811 shows the accuracy for anomalous observation vectors using detection application 322 with the detection model trained using the RPCA-FastICA algorithm. Detection application 322 with the detection model trained using the RPCA-FastICA algorithm performed better than the other three algorithms in detecting anomalies. Detection application 322 with the detection model trained using the RPCA-FastICA algorithm performed similar to the other three algorithms in accurately identifying non-anomalies meaning a comparable or lower false alarm rate.

Detection application 322 can be implemented as part of a machine learning application to identify or detect anomalies in various data including streaming data from IoT devices. Anomaly detection in multivariate case (with numerical data). Specific applications may include chemical plants, manufacturing processes, medical sensor data (e.g., monitoring patients' blood pressure). The combination of RPCA with ICA helps find the true latent sources generally resulting in better performance in outlier or anomaly detection. Detection application 322 is robust in the sense that the results are similar if different ICA methods are used as shown in FIGS. 6B and 6C. Moreover, unlike many other methods for outlier detection like SVDD, the anomaly detection performance provided by detection application 322 is not that sensitive to the tunable parameters.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    train a machine learning model by
        executing a robust principal components algorithm with a plurality of training observation vectors to compute a low-rank matrix;
        decomposing the low-rank matrix;
        determining a rank of the low-rank matrix;
        determining an orthogonal complement matrix using the decomposed low-rank matrix and the determined rank;
        projecting each observation vector of the plurality of training observation vectors using the determined orthogonal complement matrix; and
        executing an independent component analysis algorithm with the projected plurality of training observation vectors to define a demixing matrix; and
    apply the trained machine learning model by
        projecting an observation vector using the determined orthogonal complement matrix;
        multiplying the projected observation vector by the defined demixing matrix to define a demixed observation vector;
        computing a detection statistic value from the defined, demixed observation vector; and
        when the computed detection statistic value is greater than or equal to a predefined anomaly threshold value, outputting an indicator that the observation vector is an anomaly.

2. The non-transitory computer-readable medium of claim 1, wherein the indicator is output to a second computing device.

3. The non-transitory computer-readable medium of claim 2, wherein the indicator is output in an event stream sent to the second computing device.

4. The non-transitory computer-readable medium of claim 1, wherein the observation vector defines an image.

5. The non-transitory computer-readable medium of claim 1, wherein the observation vector includes a plurality of sensor measurements.

6. The non-transitory computer-readable medium of claim 5, wherein the indicator defines a non-normal operating state of a device from which the plurality of sensor measurements is sensed.

7. The non-transitory computer-readable medium of claim 1, wherein the determined orthogonal complement matrix includes a plurality of orthonormal basis vectors.

8. The non-transitory computer-readable medium of claim 1, wherein the determined orthogonal complement matrix includes a plurality of orthonormal basis vectors.

9. The non-transitory computer-readable medium of claim 1, wherein the low-rank matrix is decomposed using a singular value decomposition.

10. The non-transitory computer-readable medium of claim 9, wherein the singular value decomposition is computed based on $L=U\Sigma V^T$, where L indicates the low-rank matrix, U indicates a left decomposition matrix, $\Sigma$ indicates a diagonal matrix of singular values, V indicates a right decomposition matrix, and T indicates a transpose.

11. The non-transitory computer-readable medium of claim 10, wherein the rank of the low-rank matrix is determined as a number of non-zero singular values of Σ.

12. The non-transitory computer-readable medium of claim 11, wherein the determined orthogonal complement matrix is determined as remaining column vectors in V after removing a first r column vectors in V, where r indicates the determined rank of the low-rank matrix.

13. The non-transitory computer-readable medium of claim 1, wherein before projecting the observation vector, the computer-readable instructions further cause the computing device to:
   compute a demixed training matrix using $Q=S'W^T$, where Q indicates the demixed training matrix, S' indicates the projected plurality of training observation vectors, W indicates the defined demixing matrix, and T indicates a transpose;
   compute a norm vector by computing a Euclidean distance value from each row of the computed demixed training matrix;
   sort the computed norm vector in order of increasing value;
   compute a percentile value for each row of the sorted norm vector; and
   select the predefined anomaly threshold value as the Euclidean distance value associated with a row of the sorted norm vector having a computed percentile value greater than or equal to a predefined percentile value.

14. The non-transitory computer-readable medium of claim 13, wherein the Euclidean distance value is computed for a respective row x of the computed demixed training matrix using $$\sqrt{\sum_{i=1}^{N} x_i^2},$$

where $x_i$ indicates an $i^{th}$ entry of the respective row x of the computed demixed training matrix, and N indicates a number of dimensions of x.

15. The non-transitory computer-readable medium of claim 1, wherein before projecting the observation vector, the computer-readable instructions further cause the computing device to:
   compute a demixed training matrix using $Q=S'W^T$, where Q indicates the demixed training matrix, S' indicates the projected plurality of training observation vectors, W indicates the defined demixing matrix, and T indicates a transpose;
   compute a mean value of the demixed training matrix;
   compute a standard deviation value of the demixed training matrix; and
   compute the predefined anomaly threshold value using $T_{anomaly}=\mu+p\sigma$, where $T_{anomaly}$ indicates the predefined anomaly threshold value, μ indicates the computed mean value, p indicates a predefined number of standard deviations, and σ indicates the computed standard deviation value.

16. A computing device comprising:
   a processor; and
   a non-transitory computer-readable medium operably coupled to the processor, the computer-readable medium having computer-readable instructions stored thereon that, when executed by the processor, cause the computing device to
      train a machine learning model by
         executing a robust principal components algorithm with a plurality of training observation vectors to compute a low-rank matrix;
         decomposing the low-rank matrix;
         determining a rank of the low-rank matrix;
         determining an orthogonal complement matrix using the decomposed low-rank matrix and the determined rank;
         projecting each observation vector of the plurality of training observation vectors using the determined orthogonal complement matrix; and
         executing an independent component analysis algorithm with the projected plurality of training observation vectors to define a demixing matrix; and
      apply the trained machine learning model by
         projecting an observation vector using the determined orthogonal complement matrix;
         multiplying the projected observation vector by the defined demixing matrix to define a demixed observation vector;
         computing a detection statistic value from the defined, demixed observation vector; and
         when the computed detection statistic value is greater than or equal to a predefined anomaly threshold value, outputting an indicator that the observation vector is an anomaly.

17. A method of identifying an anomaly among a plurality of observation vectors, the method comprising:
   training, by a computing device, a machine learning model by
      executing a robust principal components algorithm with a plurality of training observation vectors to compute a low-rank matrix;
      decomposing the low-rank matrix;
      determining a rank of the low-rank matrix;
      determining an orthogonal complement matrix using the decomposed low-rank matrix and the determined rank;
      projecting each observation vector of the plurality of training observation vectors using the determined orthogonal complement matrix; and
      executing an independent component analysis algorithm with the projected plurality of training observation vectors to define a demixing matrix; and
   applying, by the computing device, the trained machine learning model by
      projecting, by the computing device, an observation vector using the determined orthogonal complement matrix;
      multiplying, by the computing device, the projected observation vector by the defined demixing matrix to define a demixed observation vector;
      computing, by the computing device, a detection statistic value from the defined, demixed observation vector; and
      when the computed detection statistic value is greater than or equal to a predefined anomaly threshold value, outputting, by the computing device, an indicator that the observation vector is an anomaly.

18. The method of claim 17, wherein the indicator is output to a second computing device.

19. The method of claim 17, wherein the observation vector defines an image.

20. The method of claim 17, wherein the observation vector includes a plurality of sensor measurements.

21. The method of claim 20, wherein the indicator defines a non-normal operating state of a device from which the plurality of sensor measurements is sensed.

22. The method of claim 17, wherein the predefined orthogonal complement matrix includes a plurality of orthonormal basis vectors.

23. The method of claim 17, wherein the determined orthogonal complement matrix includes a plurality of orthonormal basis vectors.

24. The method of claim 17, wherein the low-rank matrix is decomposed using a singular value decomposition.

25. The method of claim 24, wherein the singular value decomposition is computed based on $L=U\Sigma V^T$, where L indicates the low-rank matrix, U indicates a left decomposition matrix, $\Sigma$ indicates a diagonal matrix of singular values, V indicates a right decomposition matrix, and T indicates a transpose.

26. The method of claim 25, wherein the rank of the low-rank matrix is determined as a number of non-zero singular values of $\Sigma$.

27. The method of claim 26, wherein the determined orthogonal complement matrix is determined as remaining column vectors in V after removing a first r column vectors in V, where r indicates the determined rank of the low-rank matrix.

28. The method of claim 17, further comprising before projecting the observation vector:
    computing, by the computing device, a demixed training matrix using $Q=S'W^T$, where Q indicates the demixed training matrix, S' indicates the projected plurality of training observation vectors, W indicates the defined demixing matrix, and T indicates a transpose;
    computing, by the computing device, a norm vector by computing a Euclidean distance value from each row of the computed demixed training matrix;
    sorting, by the computing device, the computed norm vector in order of increasing value;
    computing, by the computing device, a percentile value for each row of the sorted norm vector; and
    selecting, by the computing device, the predefined anomaly threshold value as the Euclidean distance value associated with a row of the sorted norm vector having a computed percentile value greater than or equal to a predefined percentile value.

29. The method of claim 28, wherein the Euclidean distance value is computed for a respective row x of the computed demixed training matrix using $$\sqrt{\sum_{i=1}^{N} x_i^2},$$

where $x_i$ indicates an $i^{th}$ entry of the respective row x of the computed demixed training matrix, and N indicates a number of dimensions of x.

30. The method of claim 17, further comprising before projecting the observation vector:
    computing, by the computing device, a demixed training matrix using $Q=S'W^T$, where Q indicates the demixed training matrix, S' indicates the projected plurality of training observation vectors, W indicates the defined demixing matrix, and T indicates a transpose;
    computing, by the computing device, a mean value of the demixed training matrix;
    computing, by the computing device, a standard deviation value of the demixed training matrix; and
    computing, by the computing device, the predefined anomaly threshold value using $T_{anomaly}=\mu+p\sigma$, where $T_{anomaly}$ indicates the predefined anomaly threshold value, $\mu$ indicates the computed mean value, p indicates a predefined number of standard deviations, and $\sigma$ indicates the computed standard deviation value.

* * * * *